Figure 1:
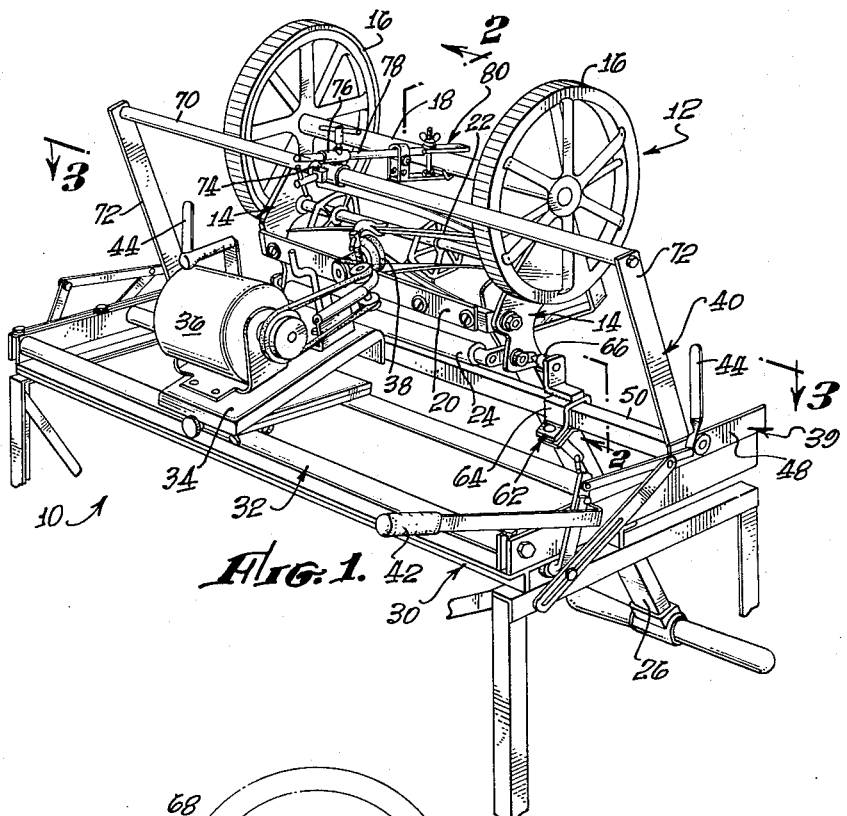

Sept. 5, 1961      F. J. MACHOVEC      2,998,677
LAWN MOWER MOUNT FOR LAWN MOWER SHARPENER Filed June 23, 1958      2 Sheets-Sheet 1

FRED J. MACHOVEC,
INVENTOR.

By HIS ATTORNEYS.

Harris, Kiech, Foster & Harris.

Sept. 5, 1961 F. J. MACHOVEC 2,998,677
LAWN MOWER MOUNT FOR LAWN MOWER SHARPENER
Filed June 23, 1958 2 Sheets-Sheet 2
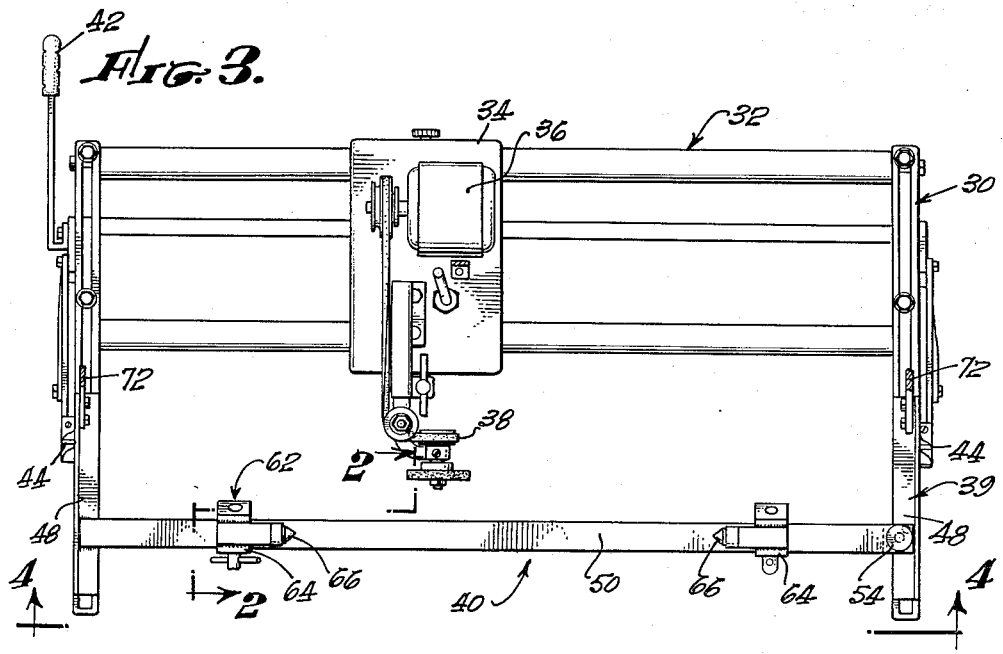
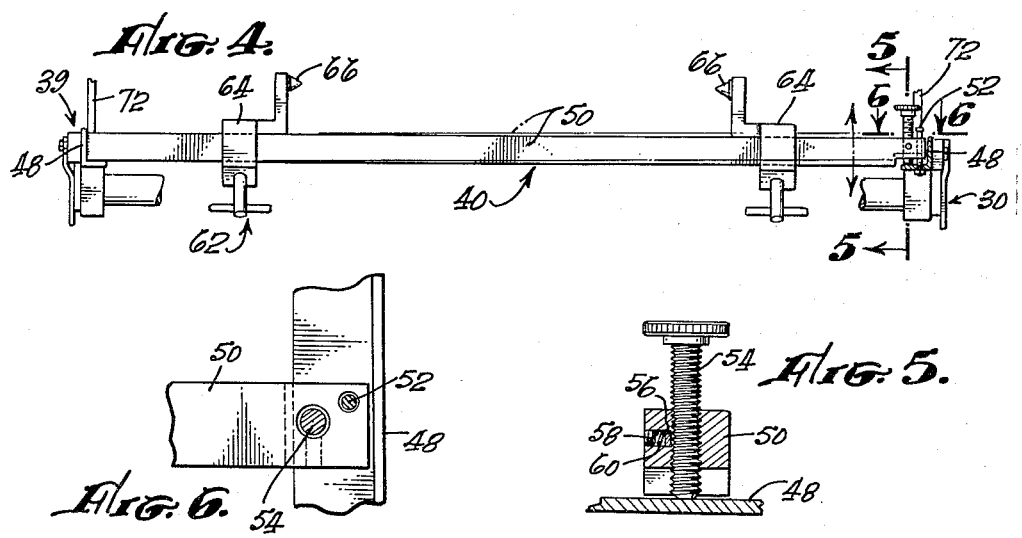
Alfred J. Machovec,
INVENTOR.
By His Attorneys.
Harris, Kiech, Foster & Harris.

United States Patent Office 2,998,677
Patented Sept. 5, 1961

2,998,677
LAWN MOWER MOUNT FOR LAWN MOWER SHARPENER
Fred J. Machovec, Pasadena, Calif., assignor to Foley Manufacturing Company, Minneapolis, Minn., a corporation of Minnesota
Filed June 23, 1958, Ser. No. 743,555
4 Claims. (Cl. 51—48)

The present invention relates in general to lawn mower sharpeners and, more particularly, to a mount or support for a reel-type lawn mower which finds particular utility when used in connection with the lawn mower sharpener disclosed in my Patent No. 2,466,905, granted April 12, 1949. The present application discloses structure which is claimed in my copending patent application Serial No. 685,334, filed September 20, 1957, now Patent No. 2,879,629, dated March 31, 1959, and in my copending patent application Serial No. 713,902, filed February 7, 1958 which matured into Patent No. 2,964,884 dated December 20, 1960.

As general background, the law mower sharpener of my Patent No. 2,466,905 includes a base, generally horizontal track means extending across the front of the base, a supporting structure carried by the base and movable in the fore and aft direction toward and away from the track means, a lawn mower mount carried by the supporting structure for positioning a lawn mower to be sharpened alongside and rearwardly of the track means, a carriage movable along the track means, and a grinding wheel on the carriage and adapted to sharpen the lawn mower.

In my Patent No. 2,466,905, the lawn mower mount includes a mounting bar carried by the supporting structure mentioned and paralleling the track means, this mounting bar carrying mounting means engageable with the lawn mower frame and being engageable by the usual ground engaging roller on the lawn mower frame. The weight of the lawn mower acts to press the roller against the mounting bar to limit pivoting thereof about the connection between the mounting means on the mounting bar and the lawn mower frame.

The foregoing lawn mower mount of my Patent No. 2,466,905, while generally satisfactory, is subject to some disadvantages in that it sometimes does not support the lawn mower sufficiently rigidly and in that wear of the roller pintles, or the bearings on the frame in which they are disposed, or wear of the roller itself, may result in serious misalignment of the lawn mower relative to the mounting bar.

A primary object of the present invention is to provide a lawn mower mount which is in no way dependent on the roller of the lawn mower and which thus avoids the foregoing disadvantages.

More particularly, an object of the invention is to provide a lawn mower mount which includes a second, upper mounting bar carried by the supporting structure mentioned above and substantially parallel to the mounting bar hereinbefore discussed, the upper mounting bar having mounting means thereon engageable with the usual tie bar which extends between the wheels of the lawn mower and which forms a part of the frame thereof.

Another object is to provide a lawn mower mount wherein the upper mounting means carried by the upper mounting bar includes clamping means engageable with the lawn-mower tie bar and adjustably connected to the upper mounting bar for movement toward and away from the upper mounting bar to accommodate lawn mowers of different sizes or types.

Another object is to provide a mount wherein the lower mounting bar is vertically adjustable at one end to align the bed knife of the lawn mower with the track means in a vertical plane, the two ends of the supporting structure being independently movable toward and away from the track means to align the bed knife with the track means in a horizontal plane, as disclosed in my prior patent.

Figure 2:
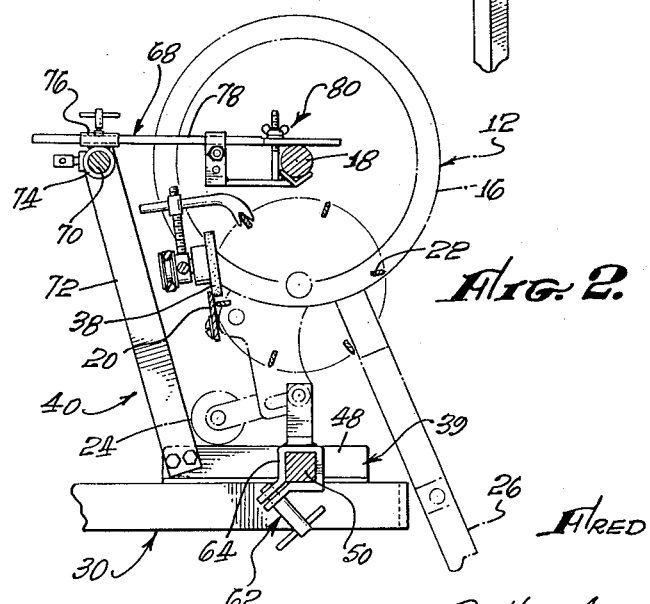

The foregoing objects, advantages, features and results of the present invention, together with various other objects, advantages, features and results thereof which will be apparent to those skilled in this art in the light of the present disclosure, may be attained with the exemplary embodiment of the invention described in detail hereinafter and illustrated in the accompanying drawings, in which:

FIG. 1 is a perspective view of a lawn mower sharpener which embodies the invention;

FIGS. 2 and 3 are enlarged, fragmentary sectional views respectively taken along the arrowed lines 2—2 and 3—3 of FIG. 1, FIG. 2 also being indicated by the arrowed line 2—2 of FIG. 3;

FIG. 4 is a fragmentary elevational view taken as indicated by the arrowed line 4—4 of FIG. 3; and FIGS. 5 and 6 are further enlarged, fragmentary sectional views respectively taken along the arrowed lines 5—5 and 6—6 of FIG. 4 of the drawings.

Referring particularly to FIG. 1 of the drawings, illustrated therein is a sharpener 10 for a lawn mower 12 having a frame 14, laterally spaced wheels 16 carried by the frame, a tie bar 18 forming part of the frame and extending between the wheels, a bed knife 20 carried by the frame rearwardly of the wheels, a reel 22 driven by the wheels and carried by the frame between the wheels and having blades engageable with the bed knife, and a ground engaging roller 24 carried by the frame rearwardly of the bed knife, the frame having a handle 26 connected thereto.

The sharpener 10 includes a base 30 carrying a track means 32 which extends across the front of the sharpener. Movable along the track means 32 is a carriage 34 having thereon a motor 36 for driving a grinding wheel 38, the latter being particularly suitable for sharpening the bed knife 20, as more fully disclosed in my aforementioned copending application Serial No. 713,902 (now Patent No. 2,964,884). For the purpose of grinding the blades of the reel 22, the motor 36 may drive a grinding wheel arranged as illustrated in my Patent No. 2,466,905, or as disclosed in my Patent No. 2,879,629.

Carried by the base 30 rearwardly of the track means 32 is a supporting structure 39 for a lawn mower mount or support 40 of the invention. As fully disclosed in my Patent No. 2,466,905, the supporting structure 39 is bodily movable toward and away from the track means 32 by mechanism actuated by a handle 42, and the ends of the supporting structure are individually slidable toward and away from the track means 32 by handles 44.

The foregoing structure of the lawn mower sharpener 10 is completely described in the patents and copending applications mentioned so that a further description herein is unnecessary, the present invention being directed to the mount 40, which will now be described in detail.

The supporting structure 39 includes supports 48 respectively disposed on opposite sides of the lawn mower sharpener 10 and carrying the mount 40, the latter including a square, lower mounting bar 50 which is rigidly connected to one of the supports 48 and which is vertically adjustable relative to the other, as best shown in FIGS. 4, 5 and 6. Such other support 48 carries a guide pin 52 which extends upwardly through the corresponding end of the lower mounting bar to guide same for movement in the vertical direction. A screw 54 extends through the lower mounting bar adjacent the guide pin 52 and bears against the corresponding support 48, a braking element 56 disposed in a bore 58 in the lower mounting bar 50 being biased into engagement with the screw 54 by a compression spring 60 to prevent unintentional rotation of the screw. The purpose of making one end of the lower mounting bar adjustable vertically is to permit bringing the bed knife 20 into parallel relation with the track means 32 in a vertical plane, the bed knife being brought into parallel relation with the track means in a horizontal plane by manipulation of the handles 44 as disclosed in my Patent No. 2,466,905.

The lower mounting bar 50 carries a lower mounting means 62 comprising two clamps 64 which may be positioned varying distances apart axially of the lower mounting bar to accommodate lawn mowers of different widths. The clamps 64 respectively carry conical pins or centers 66 engageable with the lawn mower frame 14 adjacent the roller 24, as by being insertable into sockets or holes in the frame at such locations. The mounting clamps 64 are thus similar to, and operate with relation to the lawn mower frame 14 and the lower mounting bar 50 in substantially the same manner as, the corresponding mounting clamps of my Patent No. 2,466,905.

The mounting clamps 64 partially support the lawn mower 12 in a position to be sharpened and, instead of completing the support therefor by permitting the roller 24 to engage the lower mounting bar as taught by my Patent No. 2,466,905, the present invention provides an upper mounting means 68 engageable with the tie bar 18 and carried by an upper mounting bar 70 on the supporting structure 39 above and substantially parallel to the lower mounting bar 50, the distance between the two mounting bars being substantially equal to the distance between the roller 24 and the tie bar 18. More specifically, the upper mounting bar 70 is carried by arms 72 rigidly connected to the supports 48, respectively.

The upper mounting means 68 includes a first clamp 74 on the upper mounting bar 70, this clamp being positionable in any desired location axially of the upper mounting bar. Carried by the first clamp 74 is a second clamp 76 which is oriented transversely of the upper mounting bar 70 and which adjustably receives a rod 78 extending rearwardly from the upper mounting bar. The rod 78 is provided at its rearward end with a third clamp 80 engageable with the tie bar 18 to complete the support for the lawn mower 12 provided by the mounting clamps 64 on the lower mounting bar 50.

It will be noted that the two mounting means 62 and 68 rigidly support the lawn mower 12 in a position to be sharpened, both of these mounting means engaging portions of the frame 14. Consequently, the position occupied by the lawn mower relative to the track means 32 is independent of wear of the roller 24, wear of the pintles at the ends thereof, or wear of the bearings into which the pintles extend, which is an important feature of the invention.

Although an exemplary embodiment of the invention has been disclosed herein for purposes of illustration, it will be understood that various changes, modifications and substitutions may be incorporated in such embodiment without departing from the spirit of the invention as defined by the claims which follow:

1. In a lawn mower sharpener provided with a supporting structure, a mount for a lawn mower having a frame, laterally spaced wheels carried by the frame, a tie bar forming a part of the frame and extending between the wheels, a bed knife carried by the frame rearwardly of the wheels, a reel carried by the frame between the wheels and having blades engageable with the bed knife, and a roller carried by the frame rearwardly of the bed knife, said mount being engageable with the lawn mower at only three points all spaced from the roller and including the combination of: lower mounting means carried by the supporting structure and engageable with the lawn mower frame at two points respectively adjacent the ends of the roller; and upper mounting means carried by the supporting structure above said lower mounting means and rigidly engageable with the tie bar at a third point, the upper and lower mounting means being spaced apart a distance substantially equal to the distance between the roller and the tie bar.

2. In a lawn mower sharpener provided with a supporting structure, a mount for a lawn mower having a frame, laterally spaced wheels carried by the frame, a tie bar forming a part of the frame and extending between the wheels, a bed knife carried by the frame rearwardly of the wheels, a reel carried by the frame between the wheels and having blades engageable with the bed knife, and a roller carried by the frame rearwardly of the bed knife, said mount being engageable with the lawn mower at only three points all spaced from the roller and including the combination of: a lower mounting bar carried by the supporting structure; an upper mounting bar carried by the supporting structure above and substantially parallel to said lower mounting bar; lower mounting means on said lower mounting bar engageable with the lawn mower frame adjacent the roller, said lower mounting means including two oppositely facing pins spaced apart longitudinally of the lower mounting bar and respectively engageable with the lawn mower frame adjacent the ends of the roller; and upper mounting means on said upper mounting bar engageable with the tie bar.

3. In a lawn mower sharpener provided with a supporting structure, a mount for a lawn mower having a frame, laterally spaced wheels carried by the frame, a tie bar forming a part of the frame and extending between the wheels, a bed knife carried by the frame rearwardly of the wheels, a reel carried by the frame between the wheels and having blades engageable with the bed knife, and a roller carried by the frame rearwardly of the bed knife, said mount being engageable with the lawn mower at only three points all spaced from the roller and including the combination of: a lower mounting bar carried by the supporting structure; an upper mounting bar carried by the supporting structure above and substantially parallel to said lower mounting bar; lower mounting means on said lower mounting bar engageable with the lawn mower frame at two points respectively adjacent the ends of the roller; upper mounting means on said upper mounting bar engageable with the tie bar at a third point; and means for moving one end of said lower mounting bar toward and away from said upper mounting bar.

4. In a lawn mower sharpener, the combination of: a base having a front; generally horizontal track means extending across said front of said base; a carriage movable along said track means; grinding means on said carriage; a supporting structure carried by said base and movable in the fore and aft direction toward and away from said track means; and three-point lawn mower mounting means comprising a lower mounting means carried by said supporting structure and engageable with a lawn mower at two points spaced apart in the direction of said track means, and comprising an upper mounting means carried by said supporting structure above and spaced upwardly from said lower mounting means and engageable with a lawn mower at a third point and independently of said lower mounting means, the three points mentioned being the only points of engagement of said three-point lawn mower mounting means with the lawn mower.

References Cited in the file of this patent

UNITED STATES PATENTS

| | | |
|---|---|---|
| 850,071 | Springer | Apr. 9, 1907 |
| 1,444,100 | Bierman | Feb. 6, 1923 |
| 2,142,669 | Carpenter | Jan. 3, 1939 |
| 2,377,126 | Brown | May 29, 1945 |
| 2,466,905 | Machovec | Apr. 12, 1949 |
| 2,718,097 | Bradley | Sept. 20, 1955 |
| 2,782,566 | Rogers et al. | Feb. 26, 1957 |